UNITED STATES PATENT OFFICE.

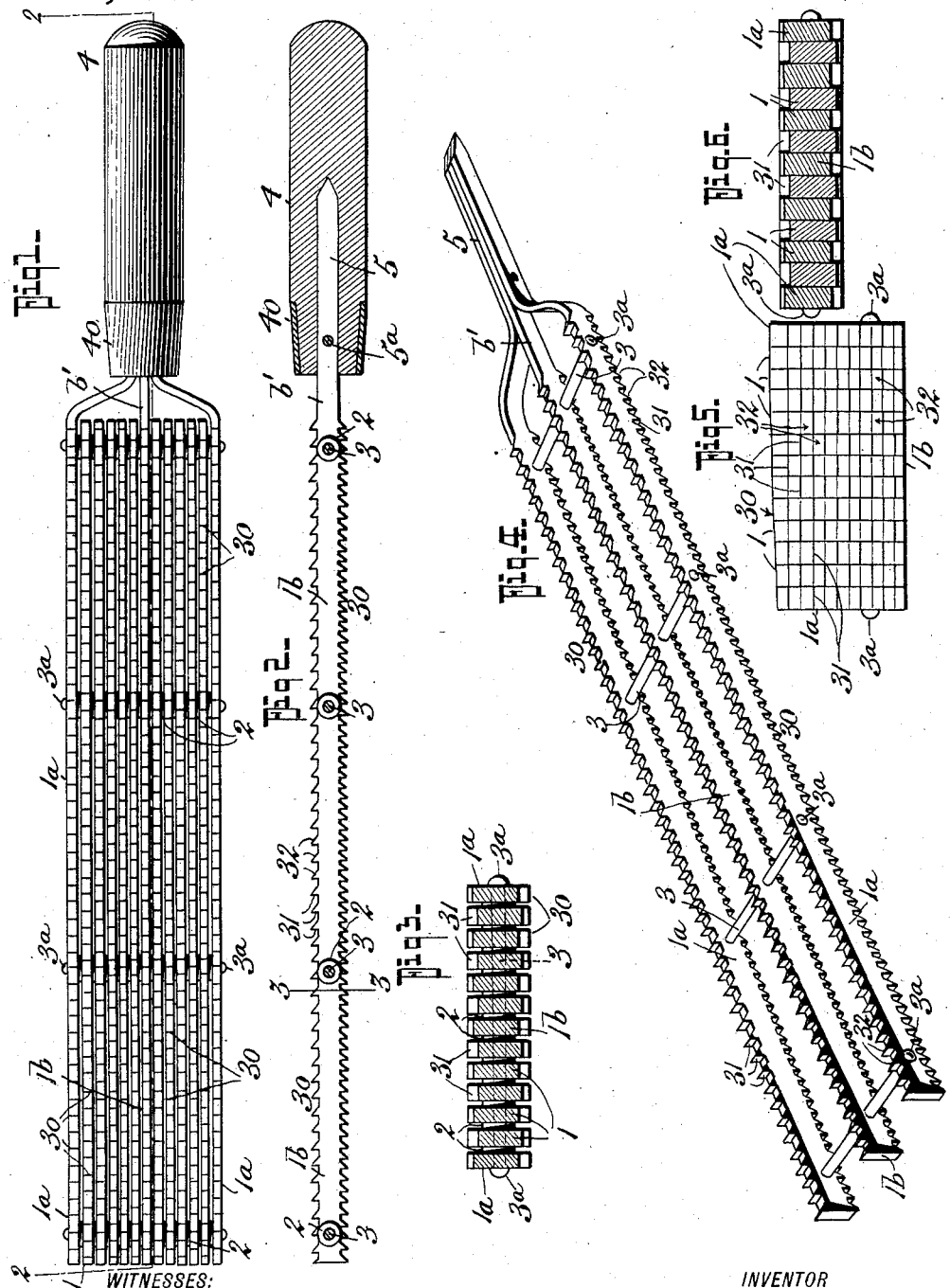

FRANK B. GARDNER, OF LIMA, OHIO, ASSIGNOR OF ONE-HALF TO DANIEL H. ETLING, OF LIMA, OHIO.

HORSE RASP OR FOOT LEVELER.

No. 901,290.　　　Specification of Letters Patent.　　　Patented Oct. 13, 1908.

Application filed May 25, 1908. Serial No. 434,904.

*To all whom it may concern:*

Be it known that I, FRANK B. GARDNER, residing at Lima, in the county of Allen and State of Ohio, have invented a new and Improved Horse Rasp or Foot Leveler, of which the following is a specification.

This invention has for its object to provide a simple inexpensive and easily manipulated horse foot rasp and it comprehends generally a series of parallelly disposed bars or ribs, laterally braced and coupled and having a number of the said bars extended beyond the others at one end and bent to form a handle receiving tang—the opposite edges of the bars having serrations or teeth, those of one edge being of a finer or closer arrangement than those on the other edge, and having their cutting edges arranged on the square, relating to the body of the bars or ribs — in contradistinction from the Λ shaped arrangement of the common form of rasps.

The invention consists in an implement of the character stated having the detailed arrangement of parts hereinafter fully described, specifically pointed out in the appended claims and illustrated in the accompanying drawings, in which, Figure 1, is a perspective view of my invention, Fig. 2, is a longitudinal section thereof, Fig. 3, is a cross section of the same on the line 3—3 on Fig. 2 and, Fig. 4, is a perspective view of the two outer most and the central one of the series of bars that constitute the body of the rasp. Fig. 5, is a detail view of a modified arrangement of the toothed bars, hereinafter referred to. Fig. 6, is a cross section thereof.

In the practical application of my invention, a body portion is provided that forms a double faced rasp and the said body is formed of a series of parallelly disposed bars or ribs 1—1$^a$—1$^a$ and 1$^b$, the bars 1$^a$—1$^a$ being the outermost ones and the bar 1$^b$ the central one of the said series. All of the bars are held apart by washers 2—2 between them, mounted on a series of cross bolts 3—3 the opposite ends of which are upset to form rivet heads 3$^a$ as shown whereby the side bars are firmly locked to their coöperating position and to form a permanent rasp head or body.

The opposite edges of each of the bars are formed with clearly defined rasping teeth 30 one edge 31 of which is square to the body, that is, projected at right angles therefrom and the other edge 32 is cut on an angle as clearly shown in Fig. 2, from which it will be also seen that while the rasp teeth on the opposite edges are of the same depth those at one side are more closely disposed whereby to provide the head or body with coarse and fine rasping surfaces, the teeth of the several bars or ribs being, however, so cut that the teeth of each adjacent pair of bars alternate, see Figs. 1 and 2, so as to provide thorough rasping surfaces.

The bars or ribs are constructed of steel and are so tempered as to admit of sharpening the teeth with a file and the said bars can be of any thickness and width, preferably one eighth by one half inch.

The outer bars 1$^a$—1$^a$ and the central bar 1$^b$ are extended beyond the others sufficiently so that the outer bars can be bent inwardly toward each other and against the extension $b'$ of the bar 1$^b$ to form a long tang 5 for receiving the handle 4 thereon which has the usual ferrule 40 and may, if desired, be clenched by a rivet pin 5, see Fig. 2.

From the foregoing description taken in connection with the drawing, the complete construction and the advantages of my invention will be apparent. By forming the bars as stated and shown, an effective double faced rasp head is provided and a very simple means of collectively holding the bars to their proper position is produced as the extensions of the end and center ones of the bars form the tang while the cross rods 2—2 firmly hold the bars from lateral displacement.

While I prefer to arrange the parallelly disposed bars as shown in Figs. 1 and 3, that is, the said bars separated by washers, I desire it understood that the washers may be dispensed with and the bars held flush against each other as shown in Fig. 5, thus making the body substantially a solid rasp. Furthermore, while I have described one edge of the teeth as projected at right angles from the body, the said edge may be inclined forwardly of the right angle at any desired degree as may be best suited for the work for which the rasp may be particularly intended.

Having thus described my invention, what I claim and desire to secure by Letters Patent is:—

1. As a new article, an implement for the purposes described that comprises a head formed of a number of parallelly disposed bars, cross bolts that extend therethrough, the said bars having their edges toothed, the outermost and the central one of the said bars being extended at one end and the outer ones bent inwardly against the central extension whereby to form a tang for receiving the handle.

2. An implement of the character described that comprises a head formed of a series of parallelly disposed and fixedly held toothed bars, transversely disposed means for clamping the bars together, the center one of the said bars being extended at one end to form a tang, the corresponding ends of the outermost bars being bent inwardly and secured to the central extension.

3. As a new article, an implement for the purposes described, comprising a head formed of a number of parallelly disposed bars, cross bolts that extend therethrough, washers on the bolts between the bars, said bars having their opposite edge toothed, the teeth having one edge at right angles to the body, the outer ones and the central one of the bars being extended at one end, and the outer ones being bent inwardly against the central extension whereby to form a tang for receiving a handle.

4. The combination of the series of bars, each having their opposite edges toothed, the teeth on one edge being of greater number than those on the other edge, the teeth on the several bars being alternately disposed in transverse direction, one edge of the teeth being at right angles to the bars, the other edge being at an angle thereto, the cross brace bolts, the spacing washers thereon, the outer most ones and the central one of the bars being extended, the outer extensions being bent inwardly against the central extension so as to form a tang and a handle fixed on the tang.

FRANK B. GARDNER.

Witnesses:
M. B. DOTY,
A. S. GRAHAM.